United States Patent [19]

Kidde

[11] 4,046,860

[45] Sept. 6, 1977

[54] AMMONIUM FLUORIDE PROCESS FOR DEFLUORINATING PHOSPHORIC ACIDS AND PRODUCTION OF AMMONIUM FLUOSILICATE

[76] Inventor: Gustave E. Kidde, 294 California Terrace, Pasadena, Calif. 91105

[21] Appl. No.: 583,584

[22] Filed: June 4, 1975

Related U.S. Application Data

[60] Division of Ser. No. 359,765, May 14, 1973, Pat. No. 3,907,973, which is a continuation-in-part of Ser. No. 231,826, March 6, 1972, abandoned.

[51] Int. Cl.$^2$ .................. C01B 25/18; C01B 33/20; C01C 1/00
[52] U.S. Cl. ........................... 423/341; 423/321 R; 423/326; 423/462
[58] Field of Search ............... 423/341, 321, 326, 462

[56] References Cited

U.S. PATENT DOCUMENTS

| 2,933,372 | 4/1960 | Manning | 423/321 |
| 2,987,376 | 6/1961 | Gloss | 423/341 X |
| 3,193,351 | 7/1965 | Miller et al. | 423/321 |
| 3,645,678 | 2/1972 | Parish et al. | 423/341 |
| 3,907,973 | 9/1975 | Kidde | 423/341 |

FOREIGN PATENT DOCUMENTS

| 210,107 | 1968 | U.S.S.R. | 423/341 |
| 791,768 | 3/1958 | United Kingdom | 423/341 |

OTHER PUBLICATIONS

Hackh's "Chemical Dictionary", 4th Ed., 1969, by Julius Grant, pp. 26 & 37. McGraw-Hill Book Co., N. Y..

"Nonveau Traite de Chimie Minerale," vol. 8, 1965, by P. Pascal, p. 349, Masson et cie, Editeurs, Paris, France.

*Primary Examiner*—Edward Stern
*Attorney, Agent, or Firm*—Lyon & Lyon

[57] ABSTRACT

A process for removing fluorine from phosphoric acid solutions comprising combining relatively dilute (e.g. 28% $P_2O_5$) fluorine-containing phosphoric acid with up to about 2% colloidal silica, heating said slurry to a temperature of about 190° F under reduced pressure in phosphoric acid concentrators and removing silicon tetrafluoride in a vapor stream. The liquid stream is concentrated (50% to 54% $P_2O_5$) phosphoric acid having a fluorine content of less than about 0.5%. The gaseous silicon tetrafluoride which also contains water vapor is alternatively scrubbed with a solution of ammonium bifluoride to convert said silicon tetrafluoride to fluosilicic acid and ammonium fluosilicate or with a solution of ammonium fluoride to convert said silicon tetrafluoride to ammonium fluosilicate. The solution of fluosilicic acid and ammonium fluosilicate, or ammonium fluosilicate alone if ammonium fluoride is used for scrubbing, is reacted with ammonia thereby converting the fluorine-containing salts to ammonium fluoride and regenerating the colloidal silica for recycle to the phosphoric acid concentrators. The ammonium fluoride is heated to recover all free ammonia which is also recycled and to convert the ammonium fluoride to ammonium bifluoride which may be sold thus resulting in a ground pollution abatement program which can operate at a profit.

8 Claims, 4 Drawing Figures

Fig. 1a.

AMMONIUM FLUORIDE PROCESS FOR DEFLUORINATING PHOSPHORIC ACIDS AND PRODUCTION OF AMMONIUM FLUOSILICATE

This application is a division of application Ser. No. 359,765, filed May 14, 1973, now U.S. Pat. No. 3,907,973 issued Sept. 23, 1975, which in turn was a continuation-in-part of then co-pending application, Ser. No. 231,826, filed Mar. 6, 1972, now abandoned.

BACKGROUND OF THE INVENTION

The field of this invention is the upgrading of phosphoric acid made by the 'wet' process. Such phosphoric acid contains fluorine in amounts sufficient to render the acid unacceptable for many uses such as animal feed additives, for use in foods for human consumption or as a raw material for the preparation of phosphate compounds used in detergent formulations. Also, the presence of fluorine in 'wet' process acid causes post-precipitation of complex fluorides which hamper production of 'merchant' acid grades of phosphoric acid. For some end uses, the presence of fluorides in the acid is not detrimental but it is likewise not beneficial and may become a source of fluoride pollution. It has therefore been recognized that valuable fluorides may be obtained from the acid and their value exceeds the cost of extraction by many fold.

Many different methods have been used to remove fluorine from phosphoric acid. The use of salts to precipitate insoluble fluorine containing compounds from the acid has not been overly successful since most precipitating agents also precipitate substantial quantities of phosphoric anhydride and such losses cannot be born economically.

Fluorine containing phosphoric acid has been subjected to vacuum concentration which removes some of the contained fluorine as a mixture of hydrogen fluoride and silicon tetrafluoride. Such methods create difficult recovery problems, give rise to waste disposal and pollution problems and do not remove sufficient fluorine to greatly enhance the quality of the concentrated phosphoric acid. The commercial practice of this vacuum process on acid containing 160 pounds of fluorine per ton of phosphoric anhydride will remove less than 100 pounds of fluorine leaving about 70 pounds in the acid.

An improved recovery system also utilizes vacuum concentration of the acid to generate fluorine-containing vapors from the impure acid. These vapors are a mixture of hydrogen fluoride and silicon tetrafluoride and are reacted to form fluosilicic acid ($H_2SiF_6$). While such a process may be operated to generate about 65% of the fluorine contained in the feed phosphoric acid, recoveries of fluorine from the vapors are less than 85% and, even at such recovery levels, the concentration of the product fluosilicic acid is too low to permit its sale on the open market without further processing. It is possible to so operate the recovery system to produce an acid of concentration sufficient to meet market requirements but this further lowers fluorine recovery to levels deemed too low to meet reasonable economic or pollution criteria.

A further improvement in a fluorine removal process comprises the addition of silica, such as diatomaceous earth, to concentrated impure acid (54% $P_2O_5$) which results in improved fluorine removal efficiency. Such a process has required a temperature of 250° F at ambient pressures and water addition to maintain phosphoric acid concentration at a constant and high level.

SUMMARY OF THE INVENTION

It is a primary object of this present invention to provide a process for removing fluorine from 'wet' process phosphoric acid.

It is another important object of the present invention to provide a fluorine removal process which produces the recovered fluorine in a usable form and which produces no undesired by-products.

It is another important object of the present invention to provide a fluorine removal process which will lower the degree of fluorine pollution emanating from 'wet' process phosphoric acid producing plants.

The invention comprises the addition of at least 1% and preferably 2% by weight of silica in colloidal form to the unconcentrated fluorine-containing phosphoric acid, heating the resulting slurry under relatively high vacuums (e.g. 50 to 180 millimeters of mercury absolute) to a temperature of about 190° F, removing the concentrated phosphoric acid stream low in fluorine content and the separate removal of a vapor stream containing silicon tetrafluoride. By the term "unconcentrated" it is intended to convey that concentration of acid normally obtained from the practice of the "wet process" phosphoric acid process prior to concentration by evaporation (e.g. 28–32%). This acid concentration step of the present invention is preferably carried out in a plurality of stages. The silicon tetrafluoride-containing vapor may then be scrubbed with a solution containing ammonium bifluoride or ammonium fluoride as desired and may or may not also contain fluosilicic acid and/or ammonium fluosilicate. When ammonium bifluoride is used for scrubbing the silicon tetrafluoride is converted to fluosilicic acid and ammonium fluosilicate. Only ammonium fluosilicate is formed when ammonium fluoride is used for scrubbing. The scrubbing step can be carried out at a relatively high temperature so that much of the water vapor contained in the concentrator overhead is not condensed in the scrubber and instead passes to a second condenser. This results in a more concentrated scrubber liquor discharge.

The aqueous solution discharged from the scrubber containing fluosilicic acid and/or ammonium fluosilicate depending on the scrubbing solution used, is next neutralized with ammonia to a pH of from about 8.8 to 9.2 which causes quantitative precipitation of the contained silica and a conversion of all fluorine containing compounds to ammonium fluoride. The silica is washed, preferably in a multi-stage washing step, and the washed silica is of sufficient quality to be recycled to the beginning of the process where it is again added to impure phosphoric acid.

The resulting ammonium fluoride may then be fed to a stripper which is held at an elevated temperature which volatilizes all free ammonia present and converts the ammonium fluoride to ammonium bifluoride and recovers all ammonia generated. The ammonium bifluoride not used directly or after being converted to ammonium fluoride as recycle, to the silicon tetrafluoride scrubbers is concentrated, crystallized and dried.

The chemical reactions involved where the scrubbing solution is ammonium bifluoride are:

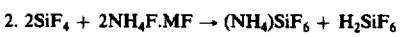

3. $(NH_4)_2SiF_6 + H_2SiF_6 + 10NH_3 \text{ (reactive)} + 4H_2O + NH_3 \text{ (free)} \rightarrow 12NH_4F + 2SiO_2 + NH_3 \text{ (free)}$ 4. $2NH_4F + NH_3 \text{ (free)} \rightarrow NH_4F \cdot HF + NH_3$ Alternatively, the aqueous scrubbing stream, containing fluosilicic acid and ammonia fluosilicate may be reacted with ammonia to convert the fluosilicic acid to ammonium fluosilicate by the following reaction:

5. $H_2SiF_6 + 2NH_3 + 2H_2O \rightarrow (NH_4)SiF_6 + 2H_2O$

Where the scrubbing solution is ammonium fluoride, the chemical reactions involved are:

6. $4F^- + SiO_2 + 4H^+ \rightarrow SiF_4 + 2H_2O$

7. $SiF_4 + 2NH_4F \rightarrow (NH_4)SiF_6$

8. $(NH_4)_2SiF_6 + 4NH_3 \text{ (reactive)} + 2H_2O + NH_3 \text{ (free)} \rightarrow 6NH_4F + SiO_2 + NH_3 \text{ (free)}$ 9. $2NH_4F + NH_3 \text{ (free)} \rightarrow NH_4F \cdot HF + NH_3 \uparrow$ 10. $NH_4F \cdot HF + NH_3 \rightarrow 2NH_4F \text{ (to 7)}$ The aqueous ammonium fluosilicate stream resulting from reactions 5 or 2 may then be concentrated by means such as a multiple effect evaporator to produce a valuable product.

DESCRIPTION OF THE PREFERRED EMBODIMENTS

Figure 1A:
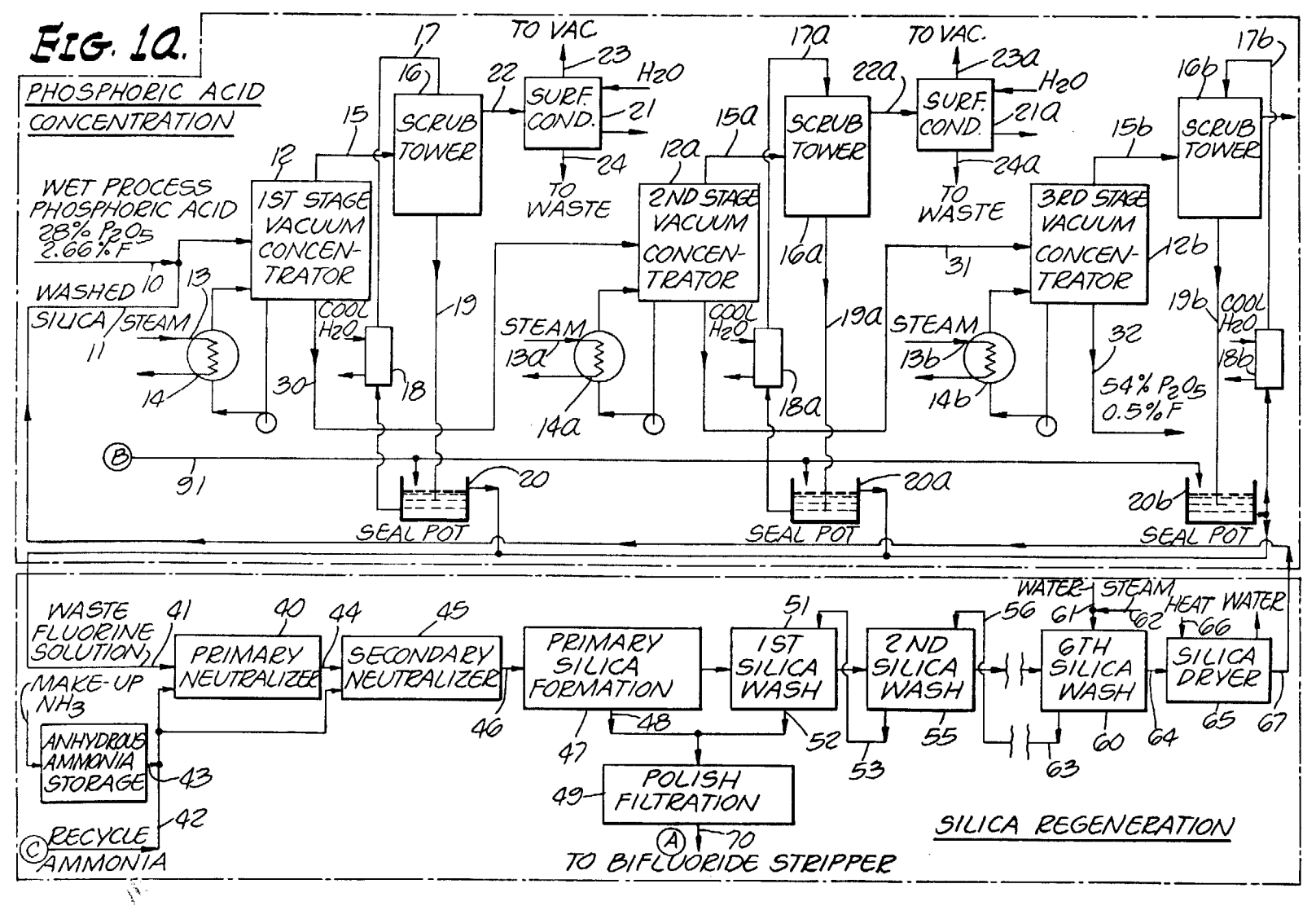
Figure 1B:
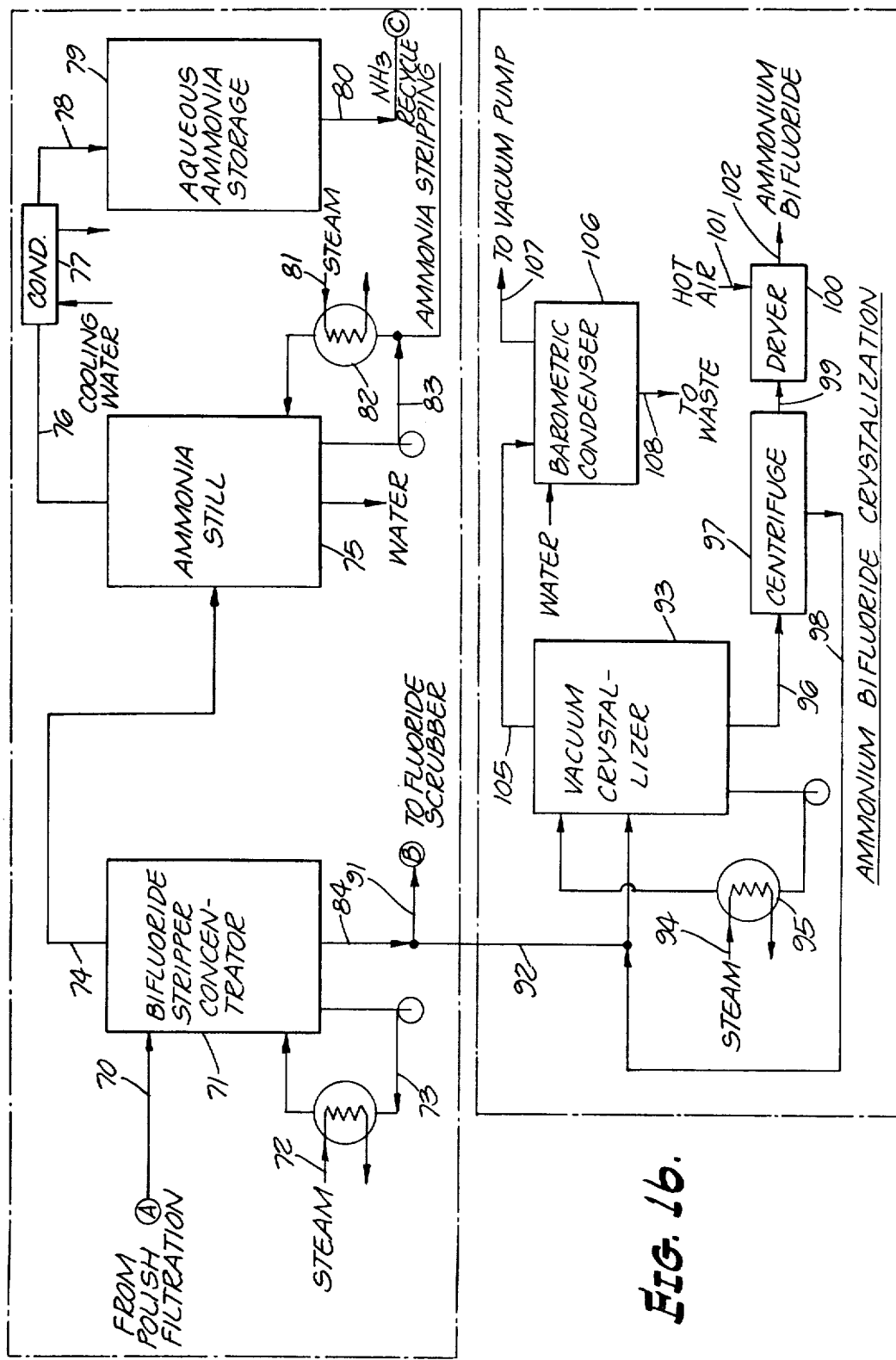
FIG. 1, comprising pages 1 and 2 of the drawings, shows a flow sheet of a first embodiment of the present invention.

Referring to FIG. 1 on page 1, and that part of page 1 labeled "Phosphoric Acid Concentration", wet process phosphoric acid 10 containing 28% $P_2O_5$ and 2.66% fluorine is mixed with washed silica 11 and fed to the first stage vacuum concentrator 12. Heat is added to the concentrator by the addition of steam 13 to heat exchanger 14. The vapor stream 15 contains silicon tetrafluoride ($SiF_4$) and water vapor. The first stage of the vacuum concentrator is operated at a temperature of about 190° F and at a vacuum of about 6 inches of mercury absolute.

The vapors 15 next enter scrubbing tower 16 which is a spray column. The scrubbing liquor 17 is cooled to a proper temperature in heat exchanger 18 and contains either fluosilicic acid, ammonium fluosilicate and ammonium bifluoride or ammonium fluosilicate and ammonium fluoride depending on the scrubbing solution used. The temperature to which the scrubbing liquor 17 is cooled should be sufficient to permit the absorption and condensation of essentially all of the fluorine containing compounds and yet the liquor temperature should be high enough to allow a substantial amount of the water vapor to remain in the vapor state. In this way the scrubbing liquor does not become unduly dilute. The total fluorine concentration in the scrubbing liquor should be between about 3.5 and 15% by weight. Its pH is controlled in the range 2.5 to 4.2 by the addition of ammonium bifluoride or ammonium fluoride through line 91. The discharge from scrubbing tower 16 passes down a barometric leg 19 to a seal pot 20.

A preferred method of maintaining vacuum in the first stage vacuum concentrator comprises the use of a total surface condenser 21 followed by a knock-out drum, not shown but connected to line 23, followed in turn by a two-stage stream jet ejector with intermediate condenser also not shown. The water discharged from condenser 21 through line 24 may be discarded or used a make-up water anywhere in this or adjacent processes. This water will contain but traces of fluorine which is a major advantage of the practice of the present invention since fluorine pollution is materially reduced. Line 24 is preferably connected to a barometric leg to maintain the vacuum in condenser 21.

The liquid stream from the first stage vacuum concentrator is a partially defluorinated phosphoric acid stream 30 having a $P_2O_5$ content in the range of 36% to 41% and this is fed to the second stage which operates in an identical manner as the first stage, except that the vacuum is maintained at about 4.2 inches of mercury absolute. The pieces of equipment and streams have been given the same reference character with the subscript 'a'.

The still more concentrated and defluorinated phosphoric acid stream 31 which exits the second stage vacuum concentrator 12a enters the third stage vacuum concentrator 12b. While the third stage has the primary function of concentrating the acid to its final 55% $P_2O_5$ since the majority of contained fluorine has already been removed, the manner of operating this stage is identical with the two other stages and the pieces of equipment and streams have been given the same reference character with the subscript "b". The surface condenser for this stage is not shown in the drawings but is identical to those in the first two stages. The defluorinated phosphoric acid stream 32 has a $P_2O_5$ content of about 54% and a fluorine content less than 0.5%.

The overflows from seal pots 20, 20a and 20b comprise the feed to the silica regeneration stage. This stream can contain fluorine from 8 to 23% and it enters a primary neutralizer 40 through line 41. If the scrubbers are operated so that the fluorine content falls below 8%, it should be concentrated by evaporation to at least 8%. The neutralization is carried out by the addition of aqueous ammonia which is a combination of recycle aqueous ammonia 42 and anhydrous ammonia 43. The pH in the primary neutralizer is adjusted to from about 3.5 to 5.0 which assures neutralization of any free acid contained in the feed to silica regeneration. This primary neutralization step reduces the odor of this fluoride containing solution and also precipitates compounds such as iron and aluminum hydroxide. The ammonium fluosilicate solution leaves the primary neutralizer through line 44 and enters a secondary neutralizer 45 where sufficient aqueous ammonia is added to give a final pH of 8.8 to 9.2. The solution should be gently agitated in the secondary neutralizer in order to cause the silica to precipitate in a more readily filterable form. At this pH all contained silica is quantitatively precipitated.

The slurry leaves the secondary neutralizer through line 46 and is dewatered in the first stage 47 of a moving multi-pan vacuum filter. A multi-pan vacuum filter sold under the trademark "Prayon" is useful in the filtration and washing steps. The liquid streams 48 and 52 from filter pans 47 and 51 are passed through a polishing filter 49 which removes any silica still in suspension. The wet silica cake passes from the first stage dewatering to the first of several wash stages 51. The cake should remain in situ during the entire wash cycle. The liquid stream 53 from the second silica wash pan is used as washing medium for the first wash. The solids-containing cake passes to a similar second silica wash which has a liquid stream 56 from the third silica wash stage not shown. A continuing series of countercurrent silica washes, not shown, are identical to stages 51 and 55. Wash stage 60 is the final wash stage and has an inlet stream of hot water 61 heated by steam 62. The liquid stream 63, from the final wash, enters the fifth silica wash stage, not shown, and the solids-containing stream 64 enters a silica dryer 65 which is heated with hot air stream 66. The dried silica stream 67 is recycled to the first stage of the vacuum concentrator 12.

The liquid stream 70 leaving the polishing filter 49 is identified by the letter "A" and is fed to the bifluoride stripping section shown in FIG. 1b of the drawings. The bifluoride stripper-concentrator 71 is heated by steam 72 fed to a reboiler through which liquid from the concentrator 71 is recycled in line 73. The stripper should be operated between about 170° F to about 230° F and an absolute pressure of from about 12 inches of mercury to about 40 inches of mercury. The vapor stream 74 from the concentrator 71 is largely ammonia and water vapors and it is fed to the aqua ammonia still 75. Heat is provided to the ammonia still 75 by feeding steam 81 to reboiler 82. Liquid from ammonia still 75 is circulated through reboiler 82 through line 83. The ammonia still has for its objective the production of an overhead vapor stream 76 containing about 28% ammonia and about 72% water and the unit has the proper internal reflux to accomplish this task. The bottoms discharged are water which is either reused in some other process or discarded. The overhead vapors are condensed in condenser 77 and the condensed aqua ammonia passes through line 78 to the aqua ammonia storage tank 79. From here the aqua ammonia is withdrawn for recycle which stream is identified by the letter "C" which is also shown in FIG. 1.

The liquid stream 84 from stripper-concentrator 71 is an aqueous solution of ammonium bifluoride and is split into two streams 91 and 92. Stream 91 is identified by letter "B" which is also shown in FIG. 1a. This ammonium bifluoride in stream 91 may be used directly as the principal chemical reactant with the silicon tetrafluoride generated in the vacuum concentrators 12, 12a and 12b or it may first be converted to ammonium fluoride by adding the appropriate amount of gaseous ammonia through line 74b before being similarly used. That ammonium bifluoride not required as a chemical reactant with the silicon tetrafluoride, either directly or after ammoniation, goes through line 92 to the vacuum crystallizer 93. Vacuum crystallizer 93 is heated by steam in heat exchanger 95. A slurry of ammonium bifluoride exits the crystallizer 93 through line 96 and enters the centrifuge 97. The liquid stream 98 from centrifuge 97 is recycled to crystallizer 93 and the solids stream 99 from centrifuge 97 is fed to dryer 100 which is heated with a stream of hot air 101. The dried ammonium bifluoride 102 is now ready for sale or other uses. The vapors 105 from crystallizer 93 are pure water and are condensed in the barometric condenser 106. Condenser 106 is connected through line 107 to a vacuum source, not shown. The water 108 leaving the condenser 106 may be cooled for reuse or disposed of to waste or other processes.

The process of the present invention has been found to be capable of generating 90 to 94% of the fluorine in the weak phosphoric acid fed to the acid vacuum concentrators. At least 98% of the fluorine so generated is recoverable as solid ammoniumbifluoride.

Figure 2A:
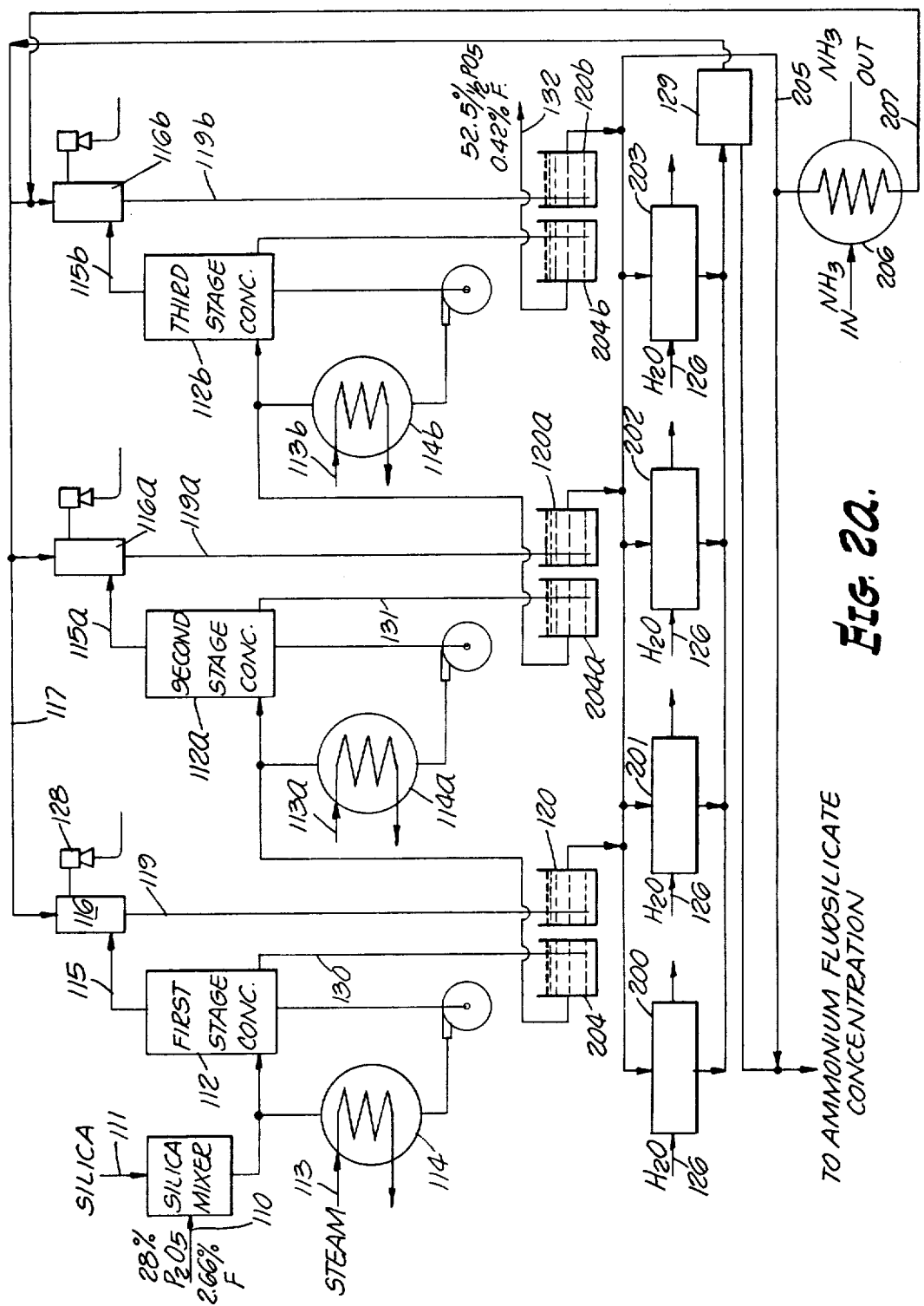
FIG. 2, comprising pages 3 and 4 of the drawings, shows a flow sheet of a second embodiment of the present invention.

An alternative embodiment is shown in FIG. 2 where "wet" process phosphoric acid 110 containing about 28% $P_2O_5$ and 2.66% Fluorine is mixed with washed silica 111 and fed to the first stage of the phosphoric acid vacuum concentrator 112. Heat is provided to the concentrator by the addition of steam 113 to heat exchanger 114. The vapor stream 115 from the concentrator 112 contains silicon tetrafluoride and water vapor and the silicon tetrafluoride is reacted with ammonium bifluoride or ammonium fluoride in the barometric condenser 116 which unit also condenses the water vapor generated in the first stage of the acid vacuum concentrator 112. The first stage of the acid vacuum concentrator 112 operates at about 190° F and 6" Hg absolute. A stream 117 containing an aqueous solution of ammonium fluosilicate, ammonium bifluoride and fluosilicic acid or ammonium fluosilicate and ammonium fluoride, depending on the scrubbing solution used, is the means of reacting chemically and condensing the vapors generated in the first stage of the acid vacuum concentrator 112. In order to keep the flow rate of stream 117 to a minimum and to provide proper vacuum conditions to the concentrator 112, the circulating stream 117 is cooled in a set of heat exchangers 200, 201, 202 and 203 which units use cooled water 126 from cooling tower, not shown, as means of heat extraction.

The preferred method of providing and maintaining vacuum in the first stage of the acid vacuum concentrator 112 comprises the use of the barometric condenser 116 with its barometric leg 119 discharging into seal pot 120. The barometric condenser 116 is connected to the vacuum pump 128 which comprises a two-stage steam jet ejector with intermediate condenser. The cooling medium for the barometric condenser 116 is returned from a barometric condenser surge tank 129 through line 117. The liquid stream 130 from the first stage acid vacuum concentrator 112 is a partially defluorinated phosphoric acid which is fed through a barometric leg and seal pot 204 to the second stage of the acid vacuum concentrator 112a. This stage operates in an identical manner as the first stage except that the vacuum conditions in the second stage are about 4.2" Hg absolute. The pieces of equipment and streams have been given the same reference character with the subscript a.

The still more concentrated and defluorinated phosphoric acid stream 131 which exits from the second stage acid vacuum concentrator 112a enters the third stage acid vacuum concentrator 112b through seal pot 204a. While the third stage of the acid vacuum concentrator 112b operates in a manner similar to the first and second stages, there are certain differences in the control of temperature of the liquid stream 115b fed to the barometric condenser 116b. These differences are necessary because the vacuum conditions in the third stage of the acid vacuum concentrator 112b are about 1.5"Hg absolute and maintenance of such high vacuum conditions dictates minimum coolant temperature conditions. To provide minimum temperature conditions, those days when the cooling tower does not provide 75° F cooled water, it is necessary to split the liquid in seal pot 120b into two equal parts. The first part is cooled in the heat exchangers 200, 201, 202 and 203. The second part is taken and passed through line 205 to the heat exchange section of the DiAmmonium Phosphate Plant ammonia vaporizer 206 and this heat exchange permits delivering a mixed coolant stream through line 207 to condenser 116B having a temperature of about 75° F and such a temperature ensures that there is adequate control of coolant temperature to produce vacuum conditions required in the third stage of the acid vacuum concentrator. The source of the ammonia used in ammonia vaporizer 206 is found in the ammonia used in other parts of the "wet" process phosphoric acid plant, particularly in the DiAmmonium Phosphate production section. The product stream 132 exiting from the third stage of the acid vacuum concentrator contains about 52.5% $P_2O_5$ and has less than 0.5% fluorine.

Figure 2B:
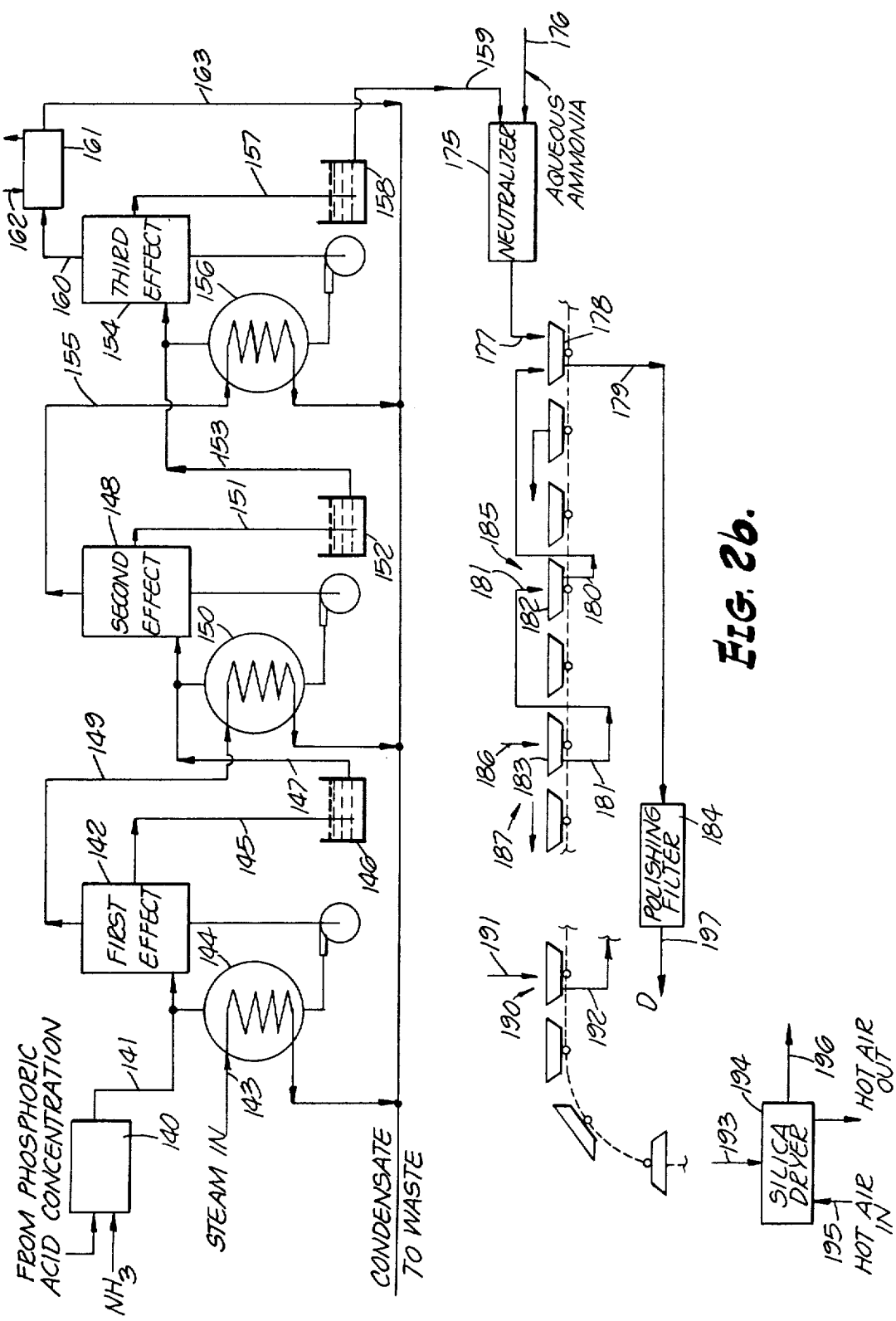

Turning now to FIG. 2b, the overflows from the barometric surge vessels 120, 120a and 120b are treated with ammonia to a pH of about 3.5 - 4.2 in neutralizer surge tank 140. This ensures that any fluosilicic acid has been completely converted to the ammonium salt $[(NH_4)_2SiF_6]$. The exit stream 141 comprises the feed to the triple effect fluosilicate vacuum concentrator which system uses steam as a heat source.

Stream 141 enters the first effect evaporator 142 whose contents are heated by steam 143 in reboiler 144. The partially concentrated liquid stream 145 is passed through a barometric leg to seal pot 146. It is then pumped through line 147 into a second effect evaporator 148. The vapor 149 from the first effect evaporator 142 is passed through reboiler 150 and serves as the heat source for the second effect evaporator. Similarly the liquid phase 151 from the second effect evaporator passes through a barometric leg 151 into seal pot 152. From there it passes through line 153 into the third effect evaporator 154 which is heated by vapor 155 in reboiler 156. The liquid phase passes from the third effect 154 through a barometric leg 157 into seal pot 158 and exits as product ammonium fluosilicate 159. The vapor phase 160 from the third effect evaporator 154 is cooled in heat exchanger 161 by cooling water 162. The exit stream 163 from heat exchanger 161 is added to the condensate streams from reboilers 144, 150 and 156 and is piped to waste or cooled and used elsewhere for cooling purposes. The product 159 is a concentrated ammonium fluosilicate solution having a fluorine content varying between 10 and 14% fluorine.

This stream 159 is fed to the silica regeneration system and enters the neutralizer 175. The neutralization is carried out by the addition of aqueous ammonia 176 which comprises a combination of recycle ammonia and anhydrous ammonia. Sufficient ammonia is added to give a final pH of 8.8 to 9.2 at which pH condition all silica contained in the ammonium fluosilicate solution is precipitated. The slurry leaves the neutralizer 175 through line 177 and is dewatered in the first stage 178 of a moving multi-pan vacuum filter. The type of filter employed here is a tilting pan filter sold under the trade name PRAYON now in general use throughout the phosphate industry. There are similar types of filters manufactured by other manufacturers which will serve equally as well for this task as the PRAYON. The liquid stream 179 from filter pan 178 is passed through a polishing filter 184 which effectively removed any silica still in suspension. The wet silica from the first stage pan 178 passes to the first of several wash stages 185. The silica cake should preferably remain in situ on the pan on which it was initially deposited through out the entire wash cycles lest there be a serious decline in filter rates if the cake be moved from one pan to another. The liquid stream 181 from the second silica wash is the wash medium for the first wash stage 185. The solids-containing cake pan 183 passes to a similar second silica wash which has a liquid stream 186 as wash medium which comes from the third wash cycle, not shown. A continuing series of countercurrent washes, not shown, are identical to stages 185 and 187. Wash stage 190 is the final wash stage and has an inlet stream 191 of hot water. The liquid stream 192, from the final wash, enters the fifth silica stage, not shown, and the solids stream 193 from the final wash 190 passes to a silica dryer 194 which is heated by the hot air stream 195. The dried silica 196 is then recycled to the silica mixer of the first stage of the vacuum acid concentrator 112. The liquid stream 197 leaving the polishing filter 184 is identified by the letter "D" and may be fed to a bifluoride stripper such as that shown in FIG. 1b of the drawings and identified by reference character 71.

EXAMPLE 1

7,300 lbs. of weak wet process phosphoric acid was fed to the first stage vacuum concentrator such as that shown on page 1 of the drawings. This acid contained 28% $P_2O_5$ and 2.66% fluorine. The vapors from the first stage vacuum concentrator were reacted in the first stage scrubber tower with a 90° F solution of fluosilicic acid ($H_2SiF_6$); ammonium fluosilicate $[(NH_4)_2SiF_6]$ and ammonium bifluoride ($NH_4F.HF$) and passed to a seal box. The second and third stages operated in the same manner and the condensed and reacted vapors were fed to a seal box. The overflow stream from the seal boxes contained 180 pounds of fluosilicic acid ($H_2SiF_6$), 223 pounds ammonium fluosilicate $(NH_4)_2SiF_6$ and 1,610 pounds of water. This stream was fed to a primary neutralizer and 43 lbs. of anhydrous ammonia was added. This stream was fed to secondary neutralizer to which was added 255 lbs. of anhydrous ammonia. The resulting slurry was fed to the dewatering stage of the silica filter. The primary filtrate from the silica filter contained 337 lbs. of ammonium fluoride ($NH_4F$), 53 lbs. ammonia and 922 lbs. of water. The filtrate from the first silica wash stage contained 218 lbs. of ammonium fluoride, 34 lbs. of ammonia and 598 lbs. of water and was combined with the primary filtrate. These combined filtrates were heated, driving off free ammonia and converting the $NH_4F$ to $NH_4F.HF$. The $NH_4F.HF$ solution weighed 951 lbs. and contained 428 lbs. of $NH_4F.HF$ and 523 lbs. of water. The gaseous overhead of 213 lbs. of ammonia and 997 lbs. of water was rectified to provide ammonia for re-use in neutralization.

Of the ammonium bifluoride solution, 634 lbs. containing 285 lbs. of $NH_4F.HF$ and 349 lbs. of water were fed to a vacuum crystallizer. The vacuum crystallizer produced a slurry which was centrifuged with mother liquor being returned to the crystallizer. The wet ammonium bifluoride salt was dried at low temperatures and weighed 285 lbs. The amount of ammonium bifluoride which was added to the seal boxes was 143 lbs. ammonium bifluoride and 174 lbs. of water. The silica from the dryer weighed 150 lbs. which was mixed with the 7,300 lbs. of wet process acid, described above.

The temperatures of the scrubbing media were regulated to condense 1,430 lbs. of water in the two stages and the resulting solution went to neutralization. The final $P_2O_5$ acid had less then 0.5% fluorine. The solution going to neutralization had, during evaporator vapor scrubbing, removed 180 lbs. of the fluorine generated during evaporation which is about 91% of all fluorine generated.

EXAMPLE 2

Weak commercial phosphoric acid produced from Florida phosphate rock and containing 26% $P_2O_5$ and 2.50% fluorine was mixed with a colloidal silica precipitated from a solution of ammonium fluosilicate in a ratio of 2.00 parts of silica (dry basis) to 100 parts of weak phosphoric acid. The mixture of acid and silica was fed continuously to an agitated and heated vacuum evaporator at a rate of about 20 lbs. per hour. The evaporator operated at about 6 inches mercury absolute with indirect heat applied to the evaporator shell bottom. The vapors generated in the evaporator were scrubbed in a spray column under high vacuum conditions, using a water solution of ammonium bifluoride which was recycled over the column at a rate of about 0.72 gallons per minute. Scrubbing medium pH was maintained above 2.5 by the periodic addition of ammonium bifluoride. Scrubbing medium temperature to the spray column was controlled in a small shell and tube heat exchanger. Solution temperature entering the column was in the range of 140° to 145° F. The vapors leaving the evaporator were about 152° F while the liquid in the evaporator was in the range of 185° to 190° F. This temperature control was achieved by regulating flow of weak acid to the evaporator.

After scrubbing and partial condensation, the remaining vapors passed through a surface type heat exchanger which condensed the remaining water vapor at about 90° F under a vacuum of 6 inches mercury absolute. The remaining vapors were saturated non-condensibles which were exhausted to atmosphere through the unit's vacuum pump.

Over a test period of about 7 hours, a total of 126 lbs. of weak acid containing colloidal silica was fed to the evaporator. The scrubbing system was initially charged with 51.41 lbs. of water and 425 grams of ammonium bifluoride. Throughout the test period, additional ammonium bifluoride was added as needed to control the pH in the range of 2.5 to 3.1. At a pH below 2.5 some silica deposition occurred. The total ammonium bifluoride added during the test was 3.74 lbs.

The products from the evaporator, at the end of the test run, consisted of:

|        |                              |            |          |
|--------|------------------------------|------------|----------|
|        | Product acid                 | 74.00 lbs. | 0.4% F   |
|        | Scrubbing Medium             | 66.50 lbs. | 7.4% F   |
|        | Final Distillate             | 37.00 lbs. | TR% F    |
|        | TOTAL                        | 177.50 lbs.|          |
|        | Total Fluorine               |            | 5.22 lbs.|
|        | Fluorine in Scubbing Medium  |            | 4.92 lbs.|
| Input: |                              |            |          |
|        | Weak Acid                    | 126.00 lbs.| 2.5% F   |
|        | H$_2$O for scrubbing         | 51.41 lbs. |          |
|        | Ammonium bifluoride (cm'l)   | 3.74 lbs.  | 56.7% F  |
|        | TOTAL                        | 181.15 lbs.|          |
|        | Total Fluorine In            |            | 5.27 lbs.|

Material Balance = 177.5 × 100/181.15 = 98%
Gross Fluorine Balance = 5.22 × 100/5.27 = 99%
Fluorine Recovered in Scubbing Medium = 94%

It is assumed the material unaccounted for was in the form of pure water vapor leaving the system along with the non-condensibles.

Analytical results showed the product acid to contain about 0.4% fluorine, and 46% $P_2O_5$. The final distillate of 37 lbs. had no trace of fluorine. The scrubbing medium of 66.5 lbs., contained all the fluorine evolved from the concentrator, about 3.12 lbs., and also contained the ammonium bifluoride added for pH control. The total weight gain of the scrubbing medium corresponds to a condensation of about 8 lbs. of water from the vapors coming from the concentrators. This corresponds to a condensation of about 18% of the water from the concentrator vapor into the scrubbing medium.

Ten pounds of the scrubbing medium were neutralized with anhydrous ammonia to 8.8 pH and the precipitated silica washed until free of ammonia. The combined filtrates were placed on a hot water bath and heated until the contents had been reduced to a mass of wet crystals weighing 425 grams. These crystals, after drying, contained 51.0% fluorine and 23.0% ammonia and had a F/NH$_3$ ratio of 2.20/1.00. Since pure ammonium bifluoride has a F/NH$_3$ ratio of 2.25/1.00 it is assumed that the crystals produced are ammonium bifluoride.

The preceding illustrative examples of the process of this invention employed ammonium bifluoride as the scrubbing solution. As was disclosed above, it is also within the scope of the invention to employ ammonium fluoride as the scrubbing solution. The following example demonstrates the effectiveness of ammonium fluoride as a scrubbing solution in a one state concentration of weak phosphoric acid from 30% to 46%. 73% of the fluorine contained in the feed acid was volatilized. The 30% ammonium fluoride scrubbing solution readily absorbed fluorine from the concentrator vapors with no evidence of silica deposition in any of the equipment or of any other adverse effect.

EXAMPLE 3

A dilute phosphoric acid (30% $P_2O_5$) was concentrated in a single stage vacuum evaporator system. Colloidal silica was added to the feed acid in an amount equal to 1.5% of the weight of the acid. The evaporator was operated at about 18 inches Mercury absolute and at about 190° F. The vapors generated during evaporation were scrubbed with a 30% solution of ammonium fluoride solution in scrubbing tower. Since the scrubber was operated at a temperature and pressure which allowed vapors to pass through it, a final condenser was used in series with the scrubber. The condensibles in the scrubbing tower off gases were condensed and collected. The feed to the evaporator was continuous and concentrated phosphoric acid was withdrawn at regular intervals.

The composition of the vapors leaving the evaporator was 91% $SiF_4$ and 9% HF. These gases were readily absorbed in the 30% NH$_4$F solution. No evidence of silica deposition in any of the equipment was observed. The operating data for the system is as follows.

Analysis of the scrubbing solution at the end of the run.

|    | (NH$_4$)$_2$SiF$_6$ | 16.6% |
|----|---------------------|-------|
|    | NH$_4$F             | 11.2  |
|    | Water               | 72.2  |
|    | Total               | 100.0%|

Analysis of the condensate at the end of the run:

| (NH$_4$)$_2$SiF$_6$ | 2.1% |
|---------------------|------|
| NH$_4$F             | 0.7  |
| HF                  | 0.8  |
| Water               | 96.4 |
| Total               | 100.0% |

Other experimental data are as follows:

A. Feed to System
   30% $P_2O_5$ acid         87.50 pounds
   30% NH$_4$F solution       8.50 pounds -continued

|   |   |   |
|---|---|---|
| Evaporator heel | | 16.75 pounds |
| Colloidal silica | | 1.30 pounds |
| Total | | 114.05 pounds |

B. Discharge from the System

|   |   |
|---|---|
| Concentrated acid | 55.00 pounds |
| Scrubbing solution | 10.75 pounds |
| Final distillate | 28.25 pounds |
| Evaporator heel | 13.25 pounds |
| Unaccounted for | 6.80 pounds |
| Total | 114.05 pounds |

C. Material Balance  94.0%

D. Chemical Analyses
1. Feed Acid
   a. % $P_2O_5$  30.0%
   b. % F  1.74%
2. Product Acid
   a. % $P_2O_5$  46.2%
   b. % F  0.56%
3. Spent Scrubbing Solution
   a. % F  16.0%
   b. % $NH_3$  8.32%
   c. % $SiO_2$  5.50%
4. Final Distillate
   a. % F  2.50%
   b. % $NH_3$  0.67%
   c. % $SiO_2$  1.77%
5. Evaporator Heel
   a. % $P_2O_5$  46.9%
   b. % F  0.78%

E. $P_2O_5$ Balance

1. $P_2O_5$ - IN
   $87.50 \times 0.3 =$ 26.2 pounds
   $16.75 \times 0.4 =$ 6.7 pounds
   Total 32.9 pounds 2. $P_2O_5$ - OUT
   Product Acid $= 55 \times 0.462 =$ 25.4 pounds
   Evaporator Heel $13.25 \times 0.469 =$ 6.2 pounds
   Total 31.6 pounds 3. % $P_2O_5$ Accounted for  96.0%

F. Fluorine Balance

1. Fluorine - IN
   Feed Acid $= 87.50 \times 0.0164 =$ 1.44 pounds
   Evaporator Heel $= 16.75 \times 0.0078 =$ 0.13 pounds
   Ammonium Fluoride $= 8.5 \times .3 \times 0.514$ 1.31 pounds
   Total 2.88 pounds 2. Fluorine - OUT
   Product Acid $= 55.00 \times 0.0056 =$ 0.31 pounds
   Evaporator Heel $= 13.25 \times 0.0078 =$ 0.11 pounds
   Scrubber $= 10.75 \times 0.16 =$ 1.72 pounds
   Distillate $= 28.25 \times 0.025 =$ 0.72 pounds
   Total 2.86 pounds 3. % Fluorine Accounted for  99.3%

G. Ammonia Balance

1. Ammonia - IN  $8.5 \times 0.3 \times 0.46 =$ 1.17 pounds
2. Ammonia - OUT
   Scrubber $10.75 \times 0.0832 =$ 0.90 pounds
   Distillate $28.25 \times 0.007 =$ 0.20 pounds
   Total 1.10 pounds 3. % Ammonia Accounted for  94.0%

H. Silica Volatilized
   $10.75 \times 0.055 =$ 0.60 pounds
   $28.25 \times 0.018 =$ 0.20 pounds
   Total 0.80 pounds I. Fluorine Volatilized
   Fluorine in Feed Acid 1.44 pounds
   Fluorine in Evaporator Heel (Start) 0.13 pounds
   Less-Fluorine in Product Acid 0.31 pounds
   Less-Fluorine in Evaporator Heel
   (End) 0.11 pounds
   Fluorine Volatilized (Total) 1.15 pounds J. Composition of Evaporator Vapors (excluding water vapor)
   $SiF_4 = 0.80 \times 104/60 = 1.39$ pounds
   $HF = (1.14 - 1.02) 20/19 = 0.13$ pounds
   % $SiF_4$  91.0%
   % HF  9.0%

K. Composition of Scrubber Solution

| | | | |
|---|---|---|---|
| $(NH_4)_2SiF_6$ | 1.78 pounds | = | 16.6% |
| $NH_4F$ | 1.20 pounds | = | 11.2% |
| $H_2O$ | 7.77 pounds | = | 72.2% |
| Total | 10.75 pounds | | 100.0% |

L. Composition of Distillate

| | | | |
|---|---|---|---|
| $(NH_4)_2SiF_6$ | 0.60 pounds | = | 2.1% |
| $NH_4F$ | 0.20 pounds | = | 0.7% |
| HF | 0.23 pounds | = | 0.8% |
| $H_2O$ | 27.22 pounds | = | 96.4% |
| TOTAL | 28.25 pounds | | 100.0% |

Materials of construction must, of course, be chosen which can withstand the corrosive chemicals involved in the practice of the present invention. Rubber lined steel, carbon, and reinforced polyester-fiberglass are examples of materials which can withstand the corrosive environments present.

Advantages brought about by the practice of the process of the present invention include the large degree of recycling of reactants such as silica and ammonia together with a very high recovery of fluorine in a marketable condition. The process permits the recovery of up to 98% of all fluorine generated. The third stage of the acid concentrator need not have a fluorine scrubber unit which reduces the amount of capital required to install the present system. The addition of a fluorine scrubber to the third stage is, however, of some benefit and results in some increased fluorine recovery. The practice of the present process permits the production of a feed grade merchant (54% $P_2O_5$) phosphoric acid without any supplemental processing. There is total control of fluorine pollution in both air and water resulting from the capturing of virtually all the fluorine contained in the weak acid as a merchantable chemical (ammonium bifluoride). The fluorine containing by-products are mechantable and cause this process to be profitable even when the phosphoric acid need not be low in fluorine content, such as when used in fertilizers. The process also results in water conservation particularly in processes which can use relatively dilute fluosilicate solutions. Additional water conservation is possible by recycling the final state condensed vapors as sulfuric acid dilution water in the phosphate rock digestion step. This water is essentially pure water and can be substituted for treated water normally used as a sulfuric acid dilutant.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for removing fluorine from phosphoric acid solutions comprising;

combining unconcentrated, fluorine-containing phosphoric acid with colloidal silica to form a slurry having a colloidal silica concentration of at least about one percent by weight;

heating said slurry;

subjecting said slurry to reduced pressures thereby concentrating said slurry and volatilizing said fluorine into a vapor stream in the form of silicon tetrafluoride and thus removing a substantial portion of said fluorine from said phosphoric acid; and scrubbing said vapor stream with an aqueous scrubbing solution containing ammonium fluoride and additionally contains ammonium fluosilicate, to thereby convert said silicon tetrafluoride to ammonium fluosilicate.

2. The process of claim 1 wherein said heated slurry of phosphoric acid and silica is subjected to a three-stage vacuum concentration process to produce an end product phosphoric acid containing 50% to 55% phosphoric anhydride.

3. The process of claim 2 wherein said scrubbing step is carried out only after the first and second stages of said three stage concentration process.

4. The process of claim 1 wherein the total fluorine content of said aqueous solution is between about 3.5% and about 15.0% by weight.

5. The process of claim 1, wherein said unconcentrated, fluorine-containing phosphoric acid is less than about 32% $P_2O_5$ by weight.

6. The process of claim 1, wherein said scrubbing step is carried out in a temperature range such that the temperature is sufficiently low so that substantially all of the silicon tetrafluoride in the vapor stream will condense and be absorbed by the scrubbing solution while at the same time the temperature is sufficiently high to permit a substantial amount of the water vapor in the vapor stream to remain uncondensed.

7. The process of claim 1, wherein the pH of said scrubbing solution is maintained in the range of from about 2.5 to about 4.2.

8. The process of claim 7, wherein the pH is maintained within said range by the addition of ammonium fluoride to the scrubbing solution.

* * * * *